United States Patent
Tsai et al.

(10) Patent No.: US 7,290,709 B2
(45) Date of Patent: Nov. 6, 2007

(54) INFORMATION CARD SYSTEM

(76) Inventors: Erica Tsai, 15100 El Camino Grande, Saratoga, CA (US) 95070; John C. Tsai, 15100 El Camino Grande, Saratoga, CA (US) 95070

( * ) Notice: Subject to any disclaimer, the term of this patent is extended or adjusted under 35 U.S.C. 154(b) by 0 days.

(21) Appl. No.: 11/279,286

(22) Filed: Apr. 11, 2006

(65) Prior Publication Data

US 2006/0192018 A1    Aug. 31, 2006

Related U.S. Application Data (60) Continuation-in-part of application No. 10/711,355, filed on Sep. 13, 2004, now Pat. No. 7,025,265, which is a continuation-in-part of application No. 10/371,928, filed on Feb. 21, 2003, now Pat. No. 6,789,738, which is a division of application No. 09/835,961, filed on Apr. 10, 2001, now Pat. No. 6,561,420.

(51) Int. Cl.
- G06K 7/08      (2006.01)
- G06K 19/06     (2006.01)
- G08B 13/14     (2006.01)
- G11B 5/74      (2006.01)
- G11B 23/00     (2006.01)

(52) U.S. Cl. ............... 235/449; 235/487; 235/492; 235/493; 340/572.1; 360/131; 361/737

(58) Field of Classification Search ......... 235/449, 235/487, 492, 493; 340/572.1; 360/131, 360/133; 361/737
See application file for complete search history.

(56) References Cited

U.S. PATENT DOCUMENTS 3,686,479 A * 8/1972 Rogers et al. ............ 235/450
4,868,373 A * 9/1989 Opheij et al. ............ 235/380
5,045,676 A * 9/1991 Kime ....................... 235/487
5,748,600 A * 5/1998 Sugano et al. ......... 369/44.18
6,173,363 B1 * 1/2001 Tsuyuguchi ............. 711/115
6,339,569 B1 * 1/2002 Liu et al. ................ 369/47.27
6,417,980 B1 * 7/2002 Liu et al. .................. 360/75
6,499,659 B1 * 12/2002 King et al. ............... 235/449
6,550,678 B1 * 4/2003 Ong et al. ................. 235/454
6,561,420 B1 * 5/2003 Tsai et al. ................ 235/449
6,583,722 B2 * 6/2003 Jeutter et al. .......... 340/573.1
6,725,713 B2 * 4/2004 Adamson et al. ........ 73/146.5
6,728,059 B2 * 4/2004 Liu et al. .................. 360/75
6,760,280 B1 * 7/2004 Schoppe .................. 369/14

(Continued)

*Primary Examiner*—Daniel Walsh
(74) *Attorney, Agent, or Firm*—Raymond E. Roberts; Intellectual Property Law Offices (57) ABSTRACT

A data distribution system (10) including an information card (12) to work with a reader (14, 72). The information card (12) includes visible indicia (20) on its front, stripe zones (34) and a ring zone (36) nominally "on" its back and a radio-frequency identification (RFID) tag (70). The zones (34, 36) are suitable for magnetically recording and the RFID tag is suitable for electronically storing data. Optional characteristics for such data can concurrently be recorded or stored. The reader (14, 72) may be a linear reader (14a), a rotary reader (14b), a card-stationary reader (14c, 14d), or a RFID reader/interrogator (72), and may optionally act automatically in response to reading one or more of the optional data characteristics. If the reader (14) is a rotary reader (14b) the information card (12) may particularly be loaded into a cartridge (16) which is loaded into the rotary reader (14b).

16 Claims, 6 Drawing Sheets

U.S. PATENT DOCUMENTS

| | | | |
|---|---|---|---|
| 6,769,618 B1* | 8/2004 | Finkelstein | 235/487 |
| 6,775,080 B2* | 8/2004 | King et al. | 360/48 |
| 6,788,640 B2* | 9/2004 | Celeste | 369/272.1 |
| 6,789,738 B2* | 9/2004 | Tsai et al. | 235/486 |
| 6,814,286 B2* | 11/2004 | Cheung | 235/440 |
| 6,934,098 B2* | 8/2005 | King et al. | 360/2 |
| 6,983,882 B2* | 1/2006 | Cassone | 235/382 |
| 7,025,265 B2* | 4/2006 | Tsai et al. | 235/449 |
| 7,100,835 B2* | 9/2006 | Selker | 235/492 |
| 7,117,512 B1* | 10/2006 | Cahill | 720/745 |
| 7,132,939 B2* | 11/2006 | Tyndall et al. | 340/447 |
| 2001/0009542 A1* | 7/2001 | Benedetti | 369/280 |
| 2001/0039476 A1* | 11/2001 | Brodie | 701/213 |
| 2002/0130775 A1* | 9/2002 | Engellenner | 340/540 |
| 2002/0167890 A2* | 11/2002 | Duroj | 369/273 |
| 2003/0205615 A1* | 11/2003 | Marappan | 235/375 |
| 2004/0056102 A1* | 3/2004 | Cheung | 235/486 |
| 2004/0076105 A1* | 4/2004 | King et al. | 369/96 |
| 2004/0159707 A1* | 8/2004 | Liu et al. | 235/487 |
| 2004/0218518 A1* | 11/2004 | Liu et al. | 369/292 |
| 2005/0006462 A1* | 1/2005 | Rouille et al. | 235/380 |
| 2005/0035201 A1* | 2/2005 | Tsai et al. | 235/449 |
| 2005/0139651 A1* | 6/2005 | Lim et al. | 235/380 |
| 2006/0039246 A1* | 2/2006 | King et al. | 369/30.01 |
| 2006/0065740 A1* | 3/2006 | Lyons et al. | 235/492 |
| 2006/0124756 A1* | 6/2006 | Brown | 235/492 |
| 2006/0169785 A1* | 8/2006 | Jones | 235/491 |
| 2006/0180647 A1* | 8/2006 | Hansen | 235/375 |
| 2006/0192018 A1* | 8/2006 | Tsai et al. | 235/492 |
| 2006/0208066 A1* | 9/2006 | Finn et al. | 235/380 |
| 2006/0249574 A1* | 11/2006 | Brown et al. | 235/380 |
| 2006/0289657 A1* | 12/2006 | Rosenberg | 235/492 |
| 2007/0046369 A1* | 3/2007 | Schober et al. | 330/7 |

* cited by examiner

INFORMATION CARD SYSTEM

CROSS-REFERENCE TO RELATED APPLICATIONS

This is a continuation-in-part of application Ser. No. 10/711,355, filed Sep. 13, 2004, now U.S. Pat. No. 7,025,265, issued Apr. 11, 2006, which is a continuation-in-part of application Ser. No. 10/371,928, filed Feb. 21, 2003, now U.S. Pat. No. 6,789,738, issued Sep. 14, 2004, which is a divisional of application Ser. No. 09/835,961, filed Apr. 10, 2001, now U.S. Pat. No. 6,561,420, issued May 13, 2003.

TECHNICAL FIELD

The present invention relates generally to dynamic magnetic information storage or retrieval, and more particularly to a specific record carrier structure wherein the record is operationally in the nominal form of a rectangular card that can be moved linearly in a swipe-like manner, moved rotationally in a disk-like manner, or held stationary for information storage or retrieval.

BACKGROUND ART

The business or calling card has a long history and is widespread in almost all of modern society today. Such cards contain human visible indicia on a front face, and are typically blank or contain a small amount of additional visible indicia on the back face. These cards have, however, proven quite cost effective even for distributing the small amount of data which they can carry. They are typically made of inexpensive paper or plastic material to begin with, and their manufacture, typically by printing and cutting from larger stock is also notably inexpensive. In use, these cards are easily stored, transported, and distributed in bulk. When they are received, individually, all of this prompts their recipients to store those cards considered important and otherwise readily dispose of them.

Unfortunately, the business or calling card has not evolved as modern society has. Today we use machines to assist us by collecting, storing, categorizing, acting on data, and deleting it when finished with it. It would be nice if the business or calling card could be used by our machines for this, particularly by electronic and computerized devices like personal computers, cellular telephones, and navigational aids, but viable systems for this have yet to appear. This can be appreciated by examining some examples of attempts to modernized the business or calling card.

U.S. Pat. No. 4,945,219 by Tanaka teaches a calling card with visible data on one side and magnetically encoded data in stripes on another side. The encoded data in the card is read by passing (linearly) the card through a reader. As such, this prior art does not teach or suggest encoding data which can be read rotationally, adding identifiers to facilitate use of the encoded data, or the reader being able to automatically or particularly act on specific types of the encoded data.

U.S. Pat. No. 5,493,105 by Desai teaches a business card system with printed data on one side and encoded data in a magnetic stripe on another side. The encoded data in the card is read by passing (linearly) the card through a reader, and the reader may be coupled to a computer control system (e.g., a conventional personal computer) able to automatically act on some types of the encoded data. As such, this prior art does not teach or suggest encoding data which can be read rotationally.

U.S. Pat. No. 5,107,099 by Smith teaches a memory card system with encoded data in a magnetizable layer on one side (provision for printed data is apparently not contemplated). The memory card is read by rotating the card in a large assembly relative to an external fixed reference. A specialized tray may be used for mounting the memory card into a readout apparatus. As such, this prior art does not teach or suggest visible data, encoding data which can be read linearly, encoding data which can be read rotationally (wherein the card is rotated about an axis there through), or the reader being able to automatically or particularly act on specific types of the encoded data.

U.S. Pat. No. 4,477,618 by Ravi teaches a business card system with printed indicia on one side and data in a magnetic strip on another side. The magnetic strip may be rectangular, for linear reading, or may be curvilinear to permit mounting the business card on a sheet which, in turn, is mounted in a floppy diskette carrier that is inserted into a conventional 5¼" floppy disk drive to read the card. Accordingly, the card here also is read by rotation in a large assembly relative to an fixed reference external to the card itself. As such, this prior art does not teach or suggest encoding data which can be read rotationally (wherein the card is rotated about an axis there through), or the reader being able to automatically or particularly act on specific types of the encoded data.

U.S. Pat. Nos. 5,844,757 and 6,011,677 by Rose teach data storage cards and an adapter to read the cards (rotationally) in a personal computer floppy disk drive. Visible data may appear on one side of the card and magnetically encoded data on another side. Single or dual openings enable the card to be engaged within the adapter, aligned, and rotated for reading. As such, this prior art does not teach or suggest encoding data which can be read linearly, or the reader being able to automatically or particularly act on specific types of the encoded data. It also depends on the use of its openings in the card, which are unconventional in business and calling cards, and particularly tends to interfere with the visible data if such were present in its conventional location.

U.S. Pat. No. 5,942,744 by Kamo et al. teaches a magnetic (and optical) card system encoded data in arcs (or regions read as arcs) on one side. Printed or visible data is apparently not mentioned, but reference to the card as a replacement for prior art business and credit cards suggests such is contemplated. This card is intended for use in a specialized, dual-head unit. While the dual read heads do rotate about axes passing through the card, neither axis is centered with respect to the card. As such, this prior art does not teach or suggest encoding data which can be read linearly, or the reader being able to automatically or particularly act on specific types of the encoded data. The mechanism necessary for reading the card is also quite unconventional, as can readily be appreciated by the figures in this reference.

U.S. Pat. No. 5,864,125 by Szabo teaches a data input card including a picture or text field, miniature map segments (images), and bar-coded data which provides coordinates of a destination point. The card is electro-optically read by insertion into a slot in a global positioning system (GPS) device, which presents one of the miniature map segments (images having different map scales are taught) on a display and which instructs a user, visibly or audibly, how to reach the destination point based on the bar-coded data and a current position determined with the GPS device. As such, this prior art does not teach or suggest magnetic encoding, or reading data rotationally. In particular, the GPS device is also unconventional when the optical map segment viewer, bar code reader, and audio capabilities are provided.

In sum, none of the known prior art combines both linear and true (about a central card axis) rotational read capability. This art, generally, also contemplates using either simple linear, swipe motion type readers or complex linear or curvilinear motion type readers which will not work in modern 3.5" form factor assemblies desired in equipment such as today's personal computers. Furthermore, the awkwardness of even the present linear motion type systems is emphasized by the fact that common devices, like cellular telephones and personal digital assistants (PDAs) have not incorporated small, cheap linear type read heads. To the extent that the known prior art does provide any ability to automatically act on data, such is accomplished with unconventional and expensive equipment. Accordingly, the benefits of the ubiquitous business or calling card have yet to be effectively and economically realized in our modern, mechanized society and a more suitable information card system is needed.

DISCLOSURE OF INVENTION

Accordingly, it is an object of the present invention to provide a system for distributing data which is, at least in part, visually readable by human users and also, at least in part machine readable.

Briefly, one preferred embodiment of the present invention is an information card for distributing data. The information card has a front and back surfaces, and four edges defining a rectangular shape resembling a conventional business or calling card. The information card includes visually-recognizable indicia on its the front surface, in the traditional manner of such conventional business or calling cards. On its back surface the information card includes at least one stripe zone and a ring zone that are suitable to contain magnetically recorded instances of the data, and the information card also includes a radio-frequency identification (RFID) tag able to store instances of the data. At least one of the zones is readable by placing the information card proximate to a stationary read mechanism, and the RFID tag is readable by placing the information card proximate to a RFID interrogator.

An advantage of the present invention is that it provides a system for distributing data in manners which are visually readable by human users, magnetically readable by linear, rotary, and stationary type reading machines, and electronically readable by a radio-frequency interrogator.

Another advantage of the invention is that its media, an "information card," may be chosen to resemble conventional business or calling cards, with visually readable indicia for human users on one side, magnetically recorded data on another side, and electronically stored data within an integrated circuit stored within. The information card may also be constructed largely of similar materials as such conventional cards, making the information cards easy and inexpensive to manufacture, and encouraging their ready and wide distribution and usage. Those receiving the information card may keep them, "download" the data they contain, or simply dispose of them, as they see fit.

Another advantage of the invention is that the data which is stored magnetically or electronically in them may be stored with data identifiers, so that the reader may store the data or act automatically with respect to it when reading such a data identifier. Notably, such data identifiers can conform with the Smart Tag format that is increasingly used by extensible markup language (XML) based software.

Another advantage of the invention is that the magnetically and electronically stored data may be stored in multiple manners. For example, multiple machine readable formats can be supported and the data can be stored in multiple human languages.

Another advantage of the invention is that it may employ popular and widely available mechanisms for reading the data being distributed. The information card media can be swiped linearly through a linear reader. Many linear readers are already in use today, and adding such to systems like cellular telephones and personal computers is quite feasible because of the potential small size and low cost of linear reader mechanisms.

Card-stationary readers can also be used, and in systems like cellular telephones and personal digital assistants (PDAs) these provide additional benefits, such as increasing data read-write speed, simplifying card orientation by users, and eliminating read-write inconsistency due to speed variation.

Alternately, the information card media can be rotated in the manner of a disk in a rotary reader. Many rotary readers are also already in use, such as the very common example of removable disk drive units in personal computers. In this regard, embodiments of the invention can operate with the information card being mounted in a cartridge which, in turn, is mounted in a conventional floppy disk drive to read the information card.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 1a-b are block diagrams depicting the major elements of various exemplary embodiments of the data distribution system in accord with the present invention, wherein FIG. 1a shows some card-movable example embodiments and FIG. 1b shows some card-stationary example embodiments;

FIG. 2b is a bottom plan view of the information card of FIG. 2a;

FIG. 5a-e schematically represent an information card according to the present invention that further has an integrated radio-frequency identification (RFID) capability, wherein FIG. 5a is stylized a bottom plan view, FIG. 5b is a bottom plan view, FIG. 5c depicts a first exemplary circuit diagram including a security switch, FIG. 5d depicts a second exemplary circuit diagram adding a photo-electric power source, and FIG. 5e depicts a third exemplary circuit diagram including a security switch instead adding a piezo-electric power source.

In the various figures of the drawings, like references are used to denote like or similar elements or steps.

BEST MODE FOR CARRYING OUT THE INVENTION

A preferred embodiment of the present invention is a system for distributing data. As illustrated in the various drawings herein, and particularly in the view of FIG. 1a-b, a preferred embodiment of the invention is depicted by the general reference character 10.

Figure 1A:
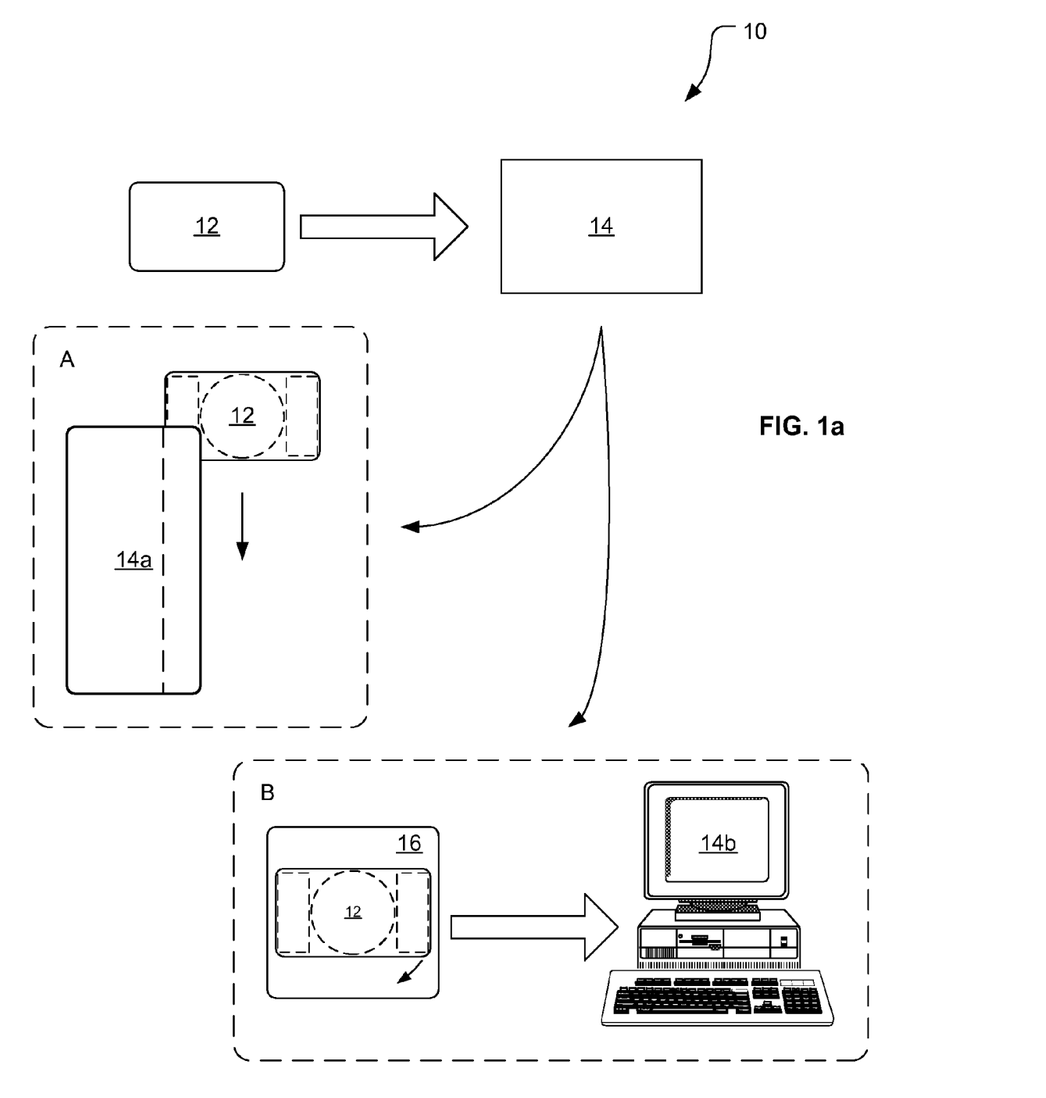
Figure 1B:
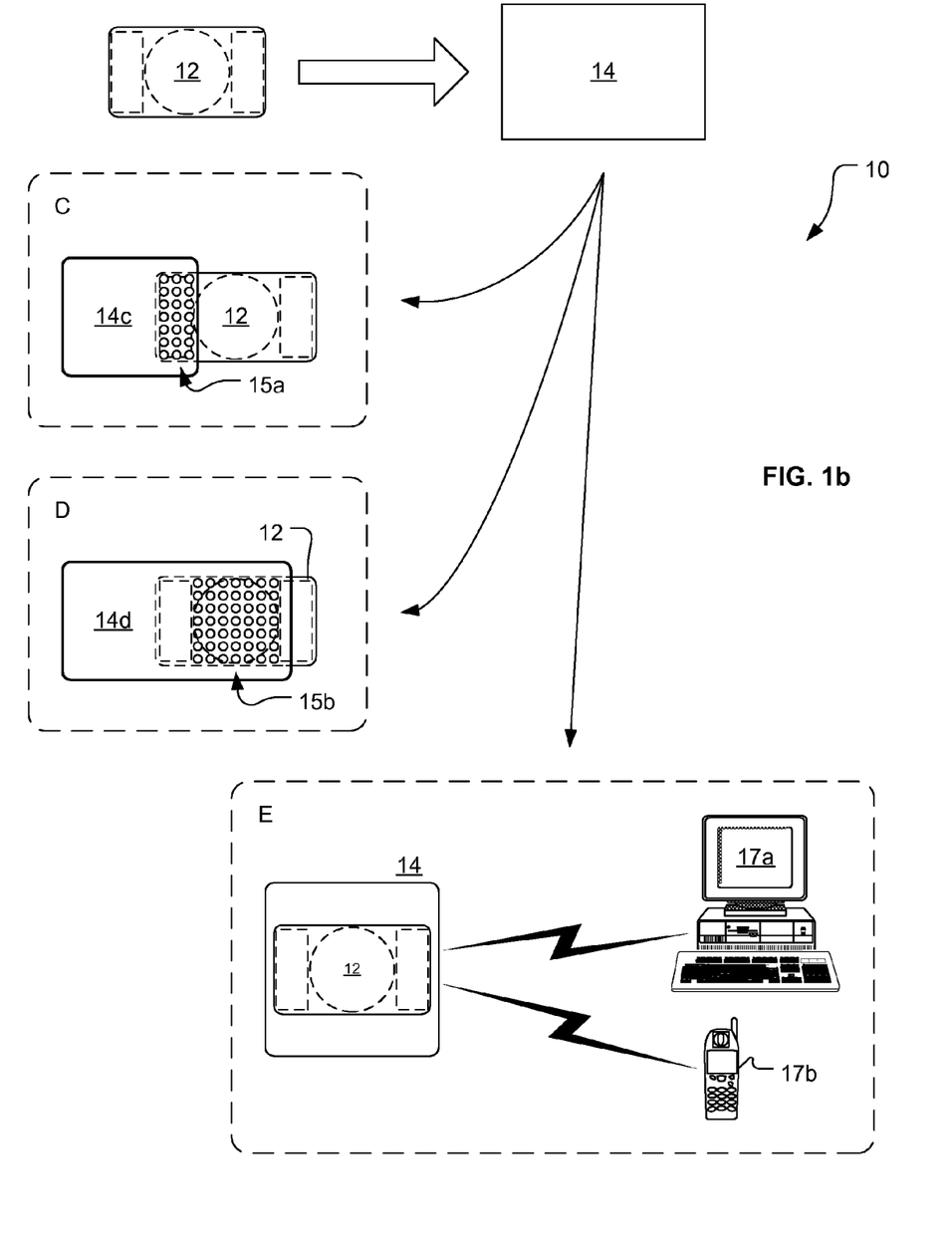

FIG. 1a-b are block diagrams depicting the major elements of various exemplary embodiments of the data distribution system 10 in accord with the present invention. As presented therein, the data distribution system 10 can generally employ an information card 12 and a reader 14 for reading data magnetically stored on the information card 12. The reader 14 may read data by moving the information card 12 linearly as depicted by insert A in FIG. 1a. When this is the case, the reader 14 is herein termed a linear reader 14a. Alternately, the reader 14 may read data by rotating the information card 12 as depicted by insert B in FIG. 1a. When this is the case, the reader 14 is herein termed a rotary reader 14b. To read the data rotationally in the rotary reader 14b, the information card 12 can first be mounted into a cartridge 16 which is loaded into the rotary reader 14b. Still alternately, the reader 14 may read data from a stationary information card 12, as depicted by inserts C and D in FIG. 1b. When this is the case, the reader 14 can be one of the cases depicted in FIG. 1b, a stationary reader 14c, 14d having a stationary sensor 15a, 15b.

FIG. 1b also stylistically depicts that the reader 14 can be a device reading or writing the data itself or it can be a device to communicate with another device able to direct reading or writing the data. For example, the reader 14 can itself be or be integrated into a personal computer, personal digital assistant, cell phone, GPS device, etc., or it can communicate with such a device. In FIG. 1b a personal computer 17a and a cellular telephone 17b are depicted as two possible examples of this. The manner of communication between the reader 14 and such devices can be entirely conventional, using a "hard-wired" connection such as an electrical or optical cable link or using a wireless connection such as an infrared light beam or a IEEE 802.11x, Bluetooth, or ZigBee radio frequency connection.

Figure 2A:
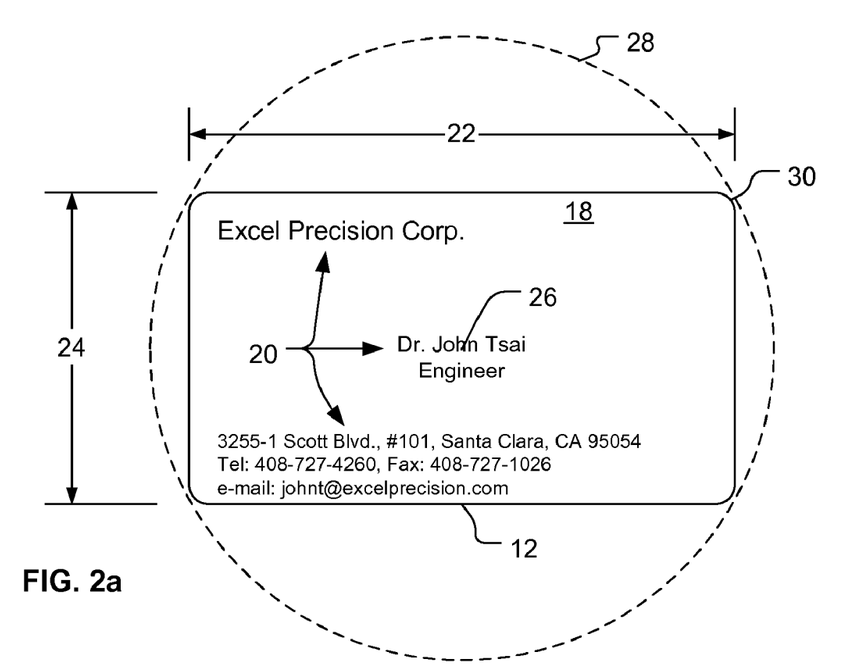
FIG. 2a is a top plan view of an information card according to the present invention.
Figure 2B:
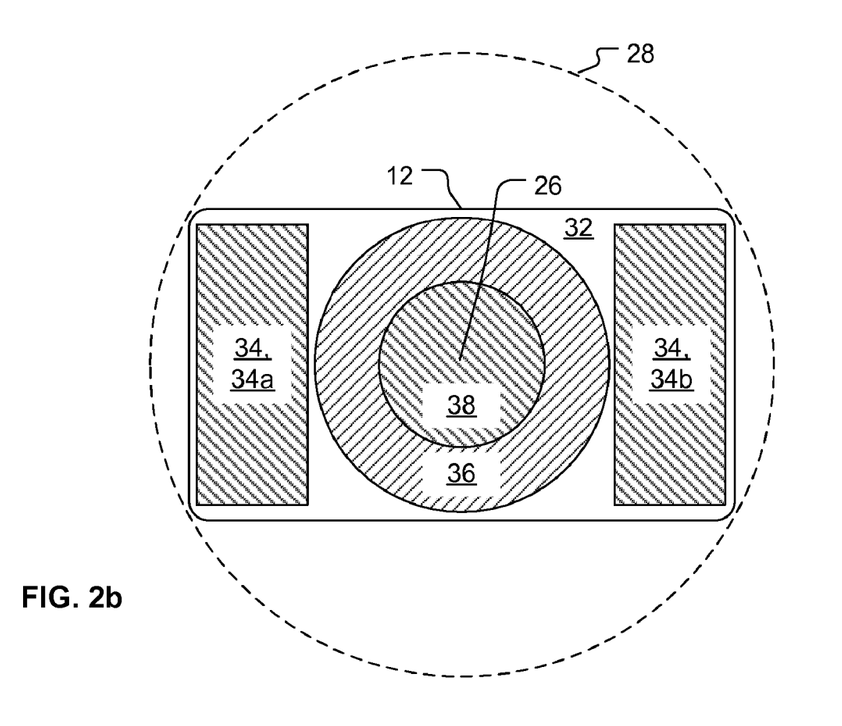

FIG. 2a-b present plan views of the information card 12. As can be seen particularly in FIG. 2a, a front surface 18 of the information card 12 may closely resemble a conventional business card or calling card. The front surface 18 may be marked with humanly visible indicia 20 such as a person's name and title, the company they represent, and an address and contact data. Machine readable indicia may also be added to the front surface 18 of the information card 12, e.g., bar coding, opto-reflective foil, etc. However, if the information card 12 is to be used as an enhanced business card, care should be taken to not unduly detract from its human visual communication role.

The preferred dimensions and shape of the information card 12, particularly when it is used with the rotary reader 14b, are nominally the same as those of conventional business cards. The front surface 18 may therefore be defined for discussion as having a face width 22, a face height 24, and a central axis 26 (normal to the drawing page). The thickness of the information card 12 may also be nominally that of a conventional business card.

The information card 12 can be constructed of any material suitable for marking with the visible indicia 20 and magnetic zones (described presently). The material used desirably has adequate stiffness and durability for repeated linear swiping of the information card 12 through the linear reader 14a, for rotation of it within the cartridge 16, and for handling when placing it proximate to the stationary sensor 15a, 15b of a stationary reader 14c, 14d. The material also may be chosen to be inexpensive, thus making the information card 12 economical and even disposable. Accordingly, paper and plastic materials make excellent substrates for the information card 12.

A circular boundary 28 (dashed line) is shown centered on the central axis 26, to represent the size of a conventional 3.5" floppy diskette. When the information card 12 is mounted into the cartridge 16 and rotated therein, much in the manner of such a diskette, the circular boundary 28 represents a constraint on the size of the information card 12. To increase the face width 22 and face height 24, and thus increase the effective usable area of the front surface 18 (and also the back surface), the corners 30 of the information card 12 may be rounded as shown in FIG. 2a-b.

FIG. 2b depicts a back surface 32 of the information card 12 of FIG. 2a. Two stripe zones 34, a ring zone 36, and a contact area 38 are depicted on the back surface 32 of the information card 12 in this particular example. These are all clearly visually demarcated in FIG. 2b, but that is merely for emphasis to facilitate understanding here. The stripe zones 34 and the ring zone 36 are magnetically readable and writable, but they need not be visually distinct from the rest of the back surface 32. Similarly, the contact area 38 has a functional purpose that does not require it to be visually distinct. In fact, in the manner of some business cards, the same or additional visible indicia as appears on the front surface 18 may also appear on the back surface 32 (say, in another language).

Another option is to make the entire back surface 32 of the information card 12 one large magnetic media region, or a large single media region aside from the contact area 38. When this is done the stripe zones 34 and the ring zone 36 may be writable/readable regions within the single magnetic media region. Making the zones 34, 36 and the contact area 38 distinct and visible has the benefit, however, of permitting users of the information card 12 to readily and intuitively recognize it as distinct from mere conventional business cards.

A left stripe zone 34a and a right stripe zone 34b are shown in FIG. 2b. Only one of these need be present, but providing and using multiple stripe zones 34 can provide various benefits. For instance, the same data can be stored in each stripe zone 34 and if one is damaged another may still be usable. Using multiple stripe zones 34 also provides more data storage capacity. For example, the same data may be stored in different stripe zones 34 in different formats, e.g., data in the left stripe zone 34a may be encoded in English and data in the right stripe zone 34b may be encoded in Japanese. Or different magnetic formats may be supported by different stripe zones 34 to permit multiple types of readers 14 to read the information card 12.

The stripe zones 34 shown in FIG. 2b are placed at the width-wise opposed edges of the information card 12, but this is also not a requirement. By reducing the diameter of the ring zone 36 enough space can be made to put stripe zones 34 along the height-wise opposed edges of the card. This can be instead of or even in addition to the left and right stripe zones 34 shown in FIG. 2b, i.e., the information card 12 may have four (or even more) stripe zones 34.

The ring zone 36 is desirably centered about the central axis 26, and thus also centrally on the back surface 32. This permits writing and reading data stored in the ring zone 36 by rotating the information card 12 in the manner of a disk. In fact, the ring zone 36 may particularly be made format compatible with a conventional 3.5" floppy disk drive. This will be described further with discussion of the cartridge 16, below.

The inventors anticipate that in many embodiments the stripe zones 34 and the ring zone 36 will contain the same data as appears in the humanly visible indicia 20. However, due to the inherently large storage capacity provided by the size of the zones 34, 36 and the nature of magnetic media, much more data may be stored in the zones 34, 36 than in the humanly visible indicia 20. The stripe zones 34 and the ring zone 36 may contain the same data, all or in part, but this is merely a matter of choice and is not a requirement or limitation.

The contact area 38 is centrally located in the back surface 32 of the information card 12. Its purpose is to receive contact with a hub in the cartridge 16, which is in turn driven by a spindle in the rotary reader 14*b*. For this reason the contact area 38 desirably has an appreciable friction or adhesion to facilitate positive engagement with the hub. The inherent nature of the material used for the information card 12 may provide for suitable engagement, or the contact area 38 may be treated to provide such, e.g., by roughening it or by coating it with an adhesive. The contact area 38 may, optionally, be retreated slightly from the overall plane of the back surface 32. This can help when stacking many of the information cards 12 together, and can minimize their sticking together if the contact area 38 is adhesive.

Figure 3:
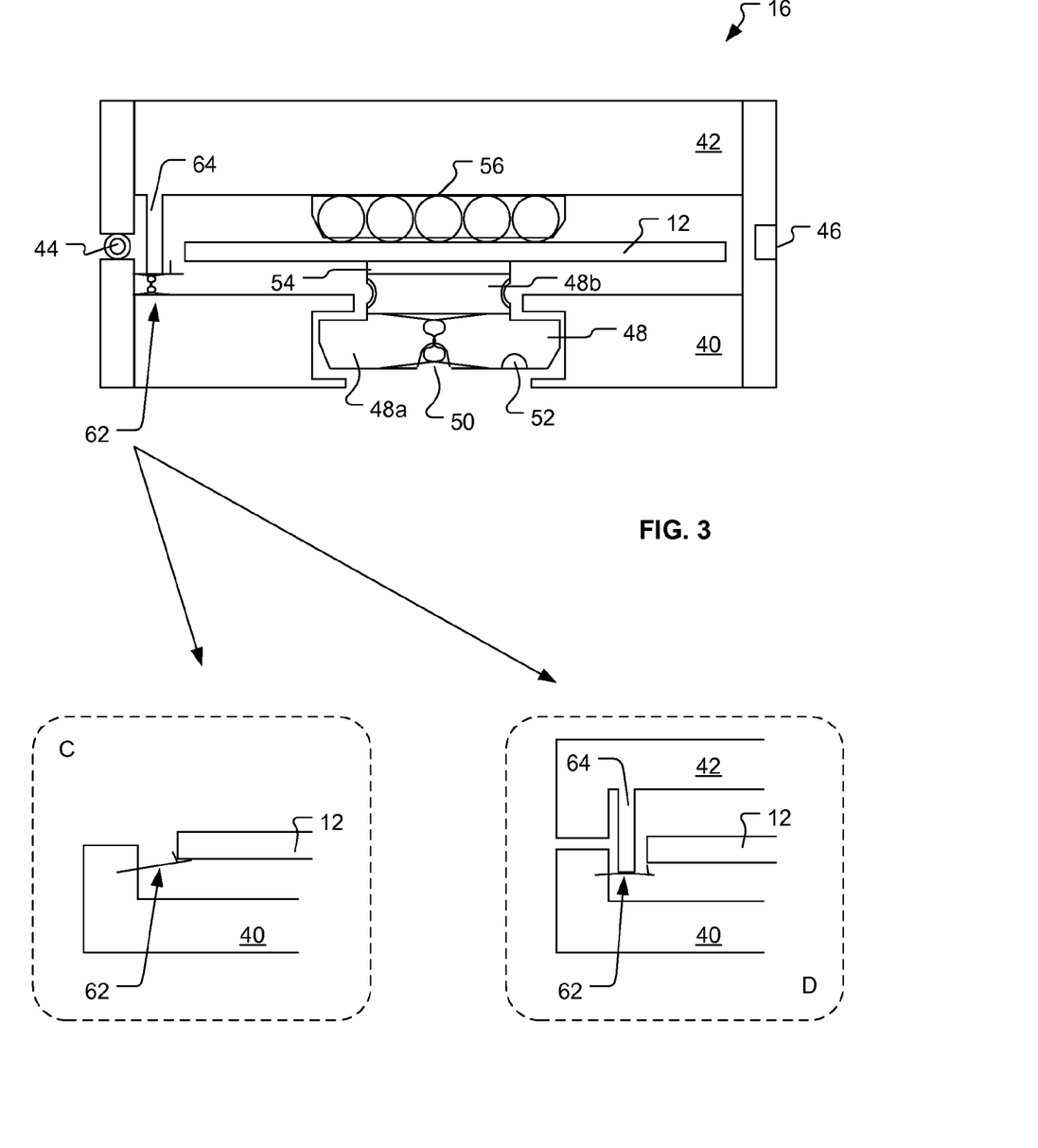
FIG. 3 is a side elevational view of a cartridge according to the present invention.

FIG. 3 is a side elevational view of a cartridge 16 which is suitable for use in the inventive data distribution system 10. The cartridge 16 carries one information card 12 and may be used to access data stored in the ring zone 36 with a rotary reader 14*b* (FIG. 1). The preferred rotary reader 14*b* is a conventional 3.5" floppy disk drive. The dimensions of the cartridge 16 may therefore be roughly the same as a conventional 3.5" floppy diskette cartridge. In FIG. 3 the vertical dimensions are somewhat exaggerated to distinguish the respective components and their relationships. The cartridge 16 may also be made stronger, for functional and durability purposes, than a conventional 3.5" floppy diskette cartridge, say, by using metal parts in all or part of its construction.

The cartridge 16 has a bottom cover 40 and a top cover 42 which are attached together at one side by a hinge 44. This permits the cartridge 16 to open and close in a clamshell-like manner. A latch 46 is provided opposite the hinge 44, to permit locking the cartridge 16 closed, as it is depicted in FIG. 3.

The bottom cover 40 includes a rotatably movable hub 48. The preferred hub 48 has a lower part 48*a* and an upper part 48*b*. When the cartridge 16 is loaded into a rotary reader 14*b* (FIG. 1) this permits a spindle to extend upward and engage with the lower part 48*a* of the hub 48, in essentially the same manner as would be the case with the center hub of a floppy disk inside a diskette cartridge. To facilitate self-alignment of the hub 48 with the spindle, the bottom surface of the hub 48 may include a centrally located alignment cup 50. The bottom surface of the hub 48 may also include a pin opening 52 to permit a pushpin in the floppy disk drive to enter and positively rotate the hub 48.

The upper part 48*b* of the hub 48 has a flat engagement area 54 on top which is suitable to engage with the contact area 38 of an information card 12. As is the case for the contact area 38, this engagement area 54 may have a friction or adhesion property chosen to facilitate positive engagement with the contact area 38.

The top cover 42 of the cartridge 16 includes a centrally located bearing unit 56. When the cartridge 16 is closed, a contained information card 12 rests atop the engagement area 54 on the hub 48 and beneath, typically in light contact with, the bearing unit 56. The preferred bearing unit 56, depicted in FIG. 3 as including a set of small ball bearings, permits full rotational and some lateral movement of the information card 12 within the cartridge 16. The information card 12 is thus movable and self-aligning within the cartridge 16 as it closes.

When the cartridge 16 is loaded into the rotary reader 14*b* (floppy disk drive), upward engagement of the spindle with the hub 48 raises it such that the engagement area 54 and the contact area 38 mate and the information card 12 is trapped. The bearing unit 56 permits further self-aligning of the information card 12 within the cartridge 16 as this occurs. In particular, however, the main role of the bearing unit 56 is to permit driven rotation of the information card 12 with force applied via the hub 48 from the spindle of the rotary reader 14*b*.

Figure 4:
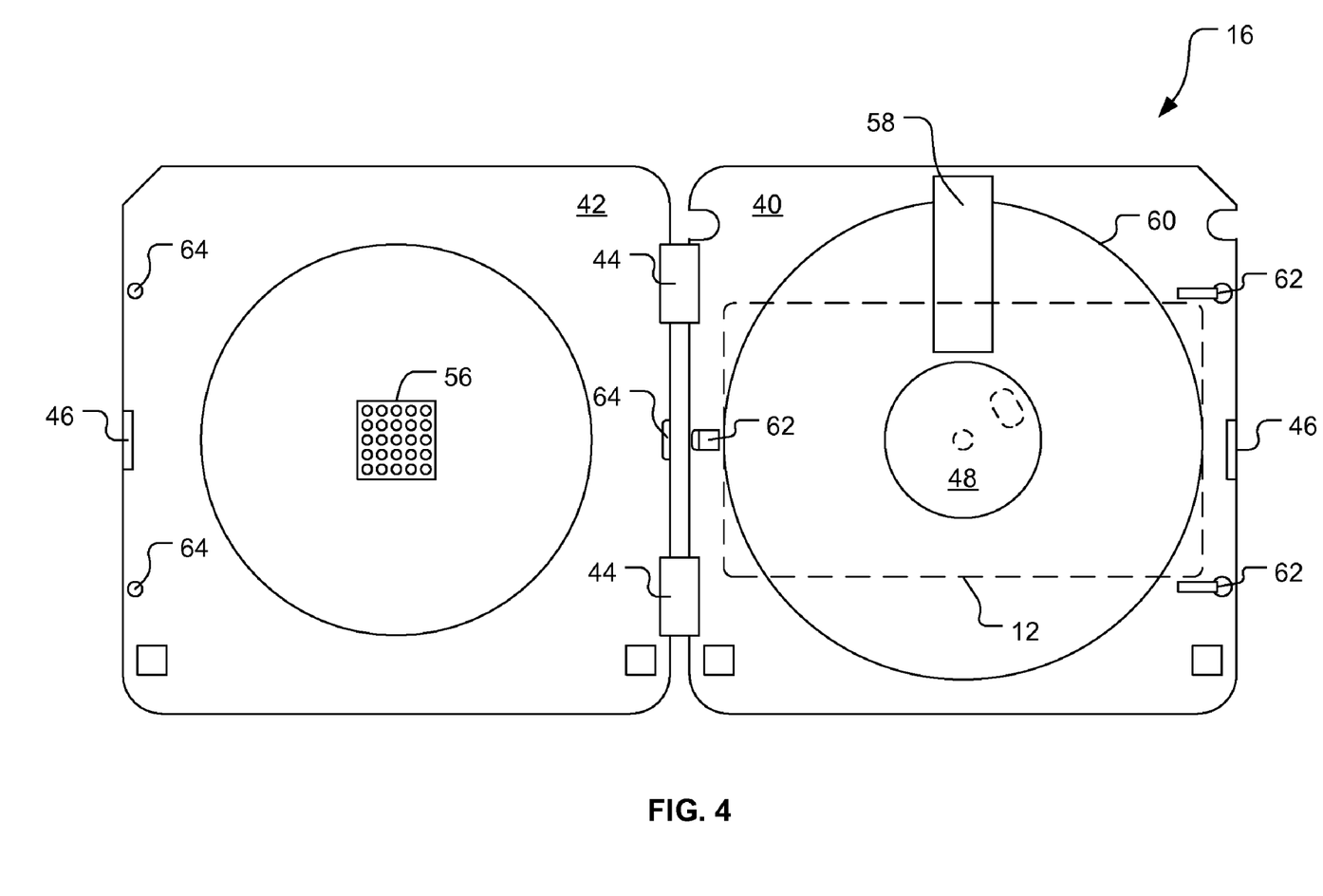
FIG. 4 is a top plan view of the cartridge of FIG. 3 in an open state.

FIG. 4 is a top plan view of the cartridge 16 in an open state without an information card 12 mounted (where one would lie is depicted in ghost outline). The bottom cover 40, the top cover 42, the hinge 44, the latch 46, and the hub 48, are again shown.

The bottom cover 40 includes a port 58 by which a read (and/or write) head in the rotary reader 14*b* may be brought close to and read data in the ring zone 36 (FIG. 2*b*) of an information card 12, in essentially the same manner the read/write read of a conventional floppy disk drive is able to access a floppy diskette. The bottom cover 40 may also, optionally, includes a cleaning liner 60 to remove contamination that might otherwise reach the read head of the rotary reader 14*b*. The cleaning liner 60 can be shaped to accommodate the size of ring zone 36 and the alignment guides (described presently). Otherwise, the cleaning liner 60 may generally be the same as conventional cleaning liners used in conventional floppy disk cartridges. Typically it will be a low-lint cloth-like material which the media surface lightly rides upon so that contamination is deposited into the cloth material. In floppy disk cartridges cleaning liners are used both above and below the media disk, for support and because both side of the media disk may bear information and carry contamination. A second cleaning liner may be provided and used in the top cover 42 of the cartridge 16, as well, but this will not generally be necessary because the information cards 12 have only the one, lower, magnetically readable side and are much more rigid than conventional, appropriately named, "floppy" diskettes.

The bottom cover 40 further includes alignment guides 62, against which an information card 12 can be abutted as it is loaded by a user. Three such alignment guides 62 are shown but more or less can be used. With brief reference back to FIG. 3 as well, the alignment guides 62 protrude upward when the cartridge 16 is open, but are pressed downward and out of the way by depressors 64 in the top cover 42 as the cartridge 16 is closed. FIG. 3 depicts how the alignment guides 62 and depressors 64 may engage and operate in this manner.

In FIG. 3, an insert C shows a preferred embodiment of the alignment guides 62 and depressors 64 in operation when the cartridge 16 is open, while an insert D shows operation when the cartridge 16 is closed. As can be seen in inserts C-D, one very simple approach is to use alignment guides 62 which springably protrude upward and engage with the information card 12 to align it when the cartridge 16 is open, yet which are springably depressed downward by the depressors 64 and disengage from the information card 12 when the cartridge 16 is closed.

In summary, the information card 12 can be manually "swiped" through a linear reader 14a to read or write data magnetically in one or more stripe zones 34 of the information card 12. This may be substantially the same as is done for reading or writing conventional credit card magnetic strips. Alternately, the information card 12 can be loaded into the cartridge 16, which is in turn loaded into the rotary reader 14b. The rotary reader 14b is then able to read or write data magnetically in the ring zone 36 of the information card 12 in essentially the same manner that it can read or write data from a conventional floppy disk. Yet alternately, a stationary reader 14c, 14d can be employed and the information card 12 can simply be placed proximate to a stationary sensor 15a, 15b for reading or writing the data.

The stripe zones 34 and in the ring zone 36 may store the data magnetically in any appropriate format which the reader 14 can handle. For instance, the data may simply be stored encoded in ASCII, if desired, and error checking and correcting codes may be used. Multiple encodings of the data in entirely different formats are possible concurrently.

As previously noted, the stripe zones 34 and the ring zone 36 typically will contain a superset of the data present in humanly visible indicia 20 on the front surface 18 of the information card 12. This may be as a machine readable encoded version of the data, and pictures, trademark drawings, corporate logos, etc. can even be included as digital image data. Alternately, or more typically additionally, the entire front surface 18 may be provided as a magnetically stored image.

The stripe zones 34 and in the ring zone 36 may optionally also store data identifiers. While card scanners and optical character recognition have long been available, the problem of identifying the data which is provided in a medium like a business card remains. Using data identifiers, the information card 12 can facilitate data recognition, categorization, and storage, particularly into databases. For example, both the stripe zones 34 and the ring zone 36 of an information card 12 may include the following ASCII text:

---

PersonName: Dr. John Tsai;
Title: President;
Telephone: 1.408.727.4260;
Fax:;
e-mail: johnt@excelprecision.com;
CompanyName: Excel Precision Corporation;
CompanyAddress: . . . ; CompanyIncorporation: California, USA; . . . ;
CompanyMainOffice: Santa Clara, California, USA;
CompanySalesOffices(4)Singapore; Tokyo, Japan; Paris, France;
. . . , etc.

---

When such an information card 12 is read with a reader 14, the data can be entered into a new database record with fields corresponding to the data identifiers, automatically or after user approval. If a database has not been provisioned to include a company's location of incorporation, say, because such is unimportant to the purpose of the database, this datum can simply be ignored. Similarly, if the database has a field for "CellularPhone:" the information card 12 does not have to include data for this (e.g., the Fax filed is empty in the above example). Furthermore, with data identifiers, the ordering of data becomes irrelevant. The fact that "CompanyIncorporation" precedes "CompanyMainOffice" need have no effect on properly reading the data into a database. Additionally, the information card 12 can store data to facilitate the rapidly growing use of Smart Tags today in common software such as word processors, spreadsheets, databases, contact managers, etc. that use extensible markup language (XML).

In appropriate devices, or with appropriate software which are able to work with the reader 14, data identifiers in information cards 12 can be used to automatically initiate actions. A cellular telephone unit (e.g., cellular telephone 17b) with a suitable reader 14 can read the contents of a data field "Telephone: . . . " and either automatically dial immediately or store the number for later "speed dial" type use. A personal digital assistant with a suitable reader 14 can automatically create a new contact entry and populate it with data from an information card 12 which has been read. Upon loading of a cartridge 16 containing an information card 12, a networked computer (e.g., personal computer 17a) with a suitable reader 14 can open and address a new e-mail to the contents of "e-mail: . . . " field. Alternately, with a mapping application the personal computer can automatically use "ComapnyGPSData: . . . " to generate a map of the area around a company's office, or to print out driving instruction to a location described in such a field. Of course, storage capacity permitting, the information card 12 itself might contain a map and even general driving instructions, but many will want the flexibility which Global Positioning System (GPS) data can provide and the inventive data distribution system 10 can accommodate this.

Also with appropriate software able to work with the reader 14, data orientators can be provided with the data to facilitate the stationary sensor 15a, 15b of a stationary reader 14c, 14d reading the data and processing the various fields in it regardless of the orientation of the information card 12 relative to the stationary sensor 15a, 15b. This permits incorporating the stationary sensor 15a, 15b into a wide range of physical embodiments of the stationary reader 14c, 14d, without having to particularly worry about educating users how to orient the information card 12 to the stationary sensor 15a, 15b or even to the stationary reader 14c, 14d.

Figure 5A:
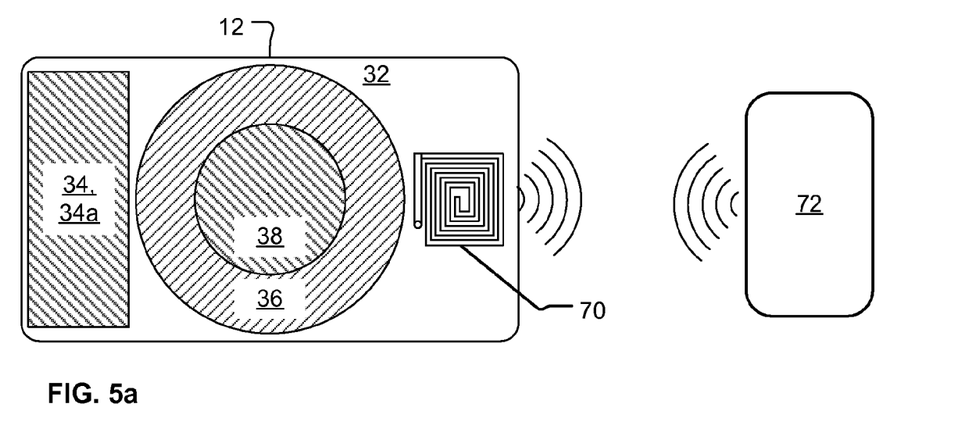
Figures 5B, 5C:
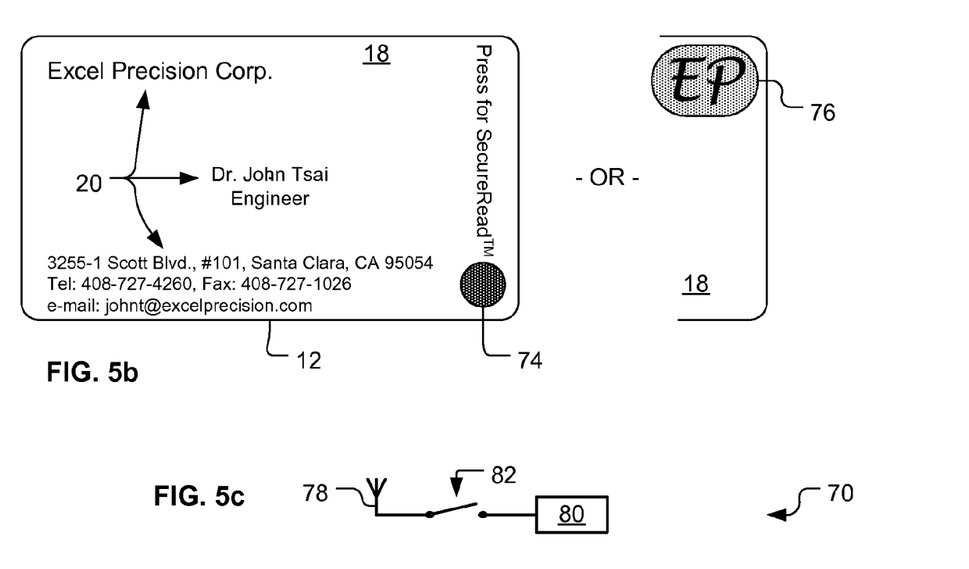
Figure 5D:
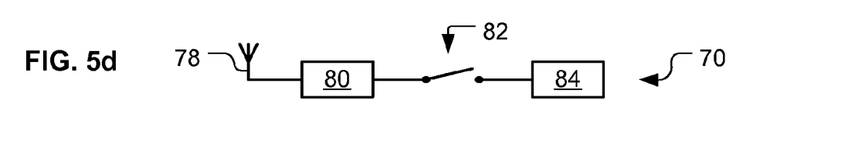
Figure 5E:
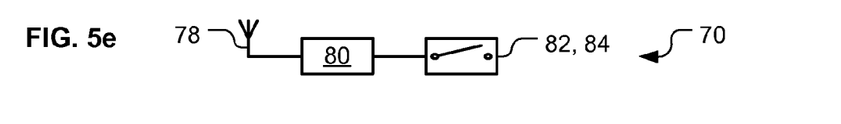

FIG. 5a-e schematically represent an information card according to the present invention that further has an integrated radio-frequency identification (RFID) capability, wherein FIG. 5a is stylized a bottom plan view (similar to FIG. 2b), FIG. 5b is a bottom plan view (similar to FIG. 2b), FIG. 5c depicts a first exemplary circuit diagram including a security switch, FIG. 5d depicts a second exemplary circuit diagram adding a photo-electric power source, and FIG. 5e depicts a third exemplary circuit diagram including a security switch instead adding a piezo-electric power source.

Turning now to FIG. 5a, this shows an embodiment of the inventive information card 12 that includes a RFID tag 70 that can be read by an external RFID reader 72. [In this art, RFID tags are also widely referred to as RFID transponders and RFID readers are also widely referred to as RFID interrogators.] In FIG. 5a the RFID tag 70 is shown replacing the right strip zone 34b of FIG. 2b, but that is merely a matter of design choice. For instance, the RFID tag 70 could instead be imbedded within the contact area 38. [RFID tags and RFID readers will only be discussed to the extent relevant here, since there are many excellent publicly available texts and product literature sources for readers seeking more background.]

For present purposes, it is noteworthy that an RFID tag can generally be either passive, meaning that it obtains energy from an external radio field, or an RFID tag can be active, meaning that it has its own power source. Due to their reliance on external power and the signal strength they can achieve with the limited power they receive, passive RFID tags usually must be closer to a RFID reader in order to be read. Passive RFID tags are also frequently limited in the amount of data that they can transmit once thus energized, and they therefore are often manufactured with smaller data storage capacities than active tags. [Note, the issue is not that a passive tag cannot be manufactured with a large data storage, but rather that entry of the tag into a RF field is usually what is used to "trigger" data transfer and the energy from one such triggering event is limited. This accordingly limits the amount of data that can be transferred before that quanta of energy is used up. More sophisticated circuitry can be used in a passive tag to avoid this limitation, but it tends to undesirably increase tag cost and bulk.]

Also for present purposes, it is noteworthy that RFID technology is controversial. Since the contents of an RFID tag can be read remotely, typically without the holder of a RFID tag being aware of this, RFID tags raise privacy concerns. For example, in the present context, the bearer of an information card 12 with a RFID tag 70 may not want others able to surreptitiously "read" the contents of the information card 12, say as they walk around at a trade show. After all, few people would be comfortable showing a competitor all of the business cards in their pocket.

Accordingly, in some embodiments of the information card 12 it may be adequate that the RFID tag 70 is a passive type, but in other embodiments it may be preferable that the RFID tag 70 is an active type. Also, in some embodiments of the information card 12 having a security feature to prohibit unauthorized reading of the RFID tag 70 may be desirable. As now discussed, there are ways to integrate such features into the inventive information card 12, even accomplishing both of these goals concurrently.

FIG. 5b depicts two variations of the information card 12 that include an active type RFID tag 70. Specifically, here these are a piezo-electric power source 74 (left-hand depiction) and a photo-electric power source 76 (right-hand depiction).

FIG. 5c depicts a circuit diagram for the RFID tag 70 of an information card 12 having read security. In its simplest conceptual form, a RFID tag can have just an antenna and an integrated circuit (IC). The RFID tag 70 here in FIG. 5c has an antenna 78 and an IC 80, and a switch 82 that separates these. The logic here is that a normally open condition of the switch 82 will ensure that the RFID tag 70 does not receive a triggering signal (or energy with which to respond in the case of a passive type device), until the switch 82 is intentionally operated by a bearer of the information card 12. If desired, this switch 82 can be placed where the piezo-electric power source 74 is shown in FIG. 5b.

FIG. 5d depicts an example circuit diagram for an information card 12 using an active type RFID tag 70. The antenna 78 and the IC 80 can be directly connected as shown here, since the RFID tag 70 requires power to operate. The switch 82 here is placed between the IC 80 and a power source 84. The nature of this power source 84 can vary. For instance it can be a battery (which is unlikely in this application, but still possible), or it could be the photo-electric power source 76 of FIG. 5b, or it could also be the piezo-electric power source 74 of FIG. 5b.

Finally, FIG. 5e depicts an example circuit diagram for a sophisticated embodiment of the information card 12 that uses an active type RFID tag 70 powered with the piezo-electric effect. Since operation of a switch is a manual action by, and since the piezo-electric effect requires mechanical operation to generate power, the rationale here is that these operations can be combined. For example, the piezo-electric power source 74 in FIG. 5b (which was purposefully represented there as resembling a button) can be manually operated (e.g., pressed) to provide power to the IC 80 in FIG. 5e (i.e., any discrete "switch" is dispensed with and only the manual action of switching is needed). In this manner, both the power needs and the security concerns of the RFID tag 70 are accommodated concurrently.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present data distribution system 10 is well suited for application in our modern, highly automated world. The system retains the advantages of human visually-readable media, and adds the advantages of magnetic machine-readability, and also adds advantages of electronic RFID type machine-readability. The data stored and distributed may include, all or in part, the human visually-readable indicia on its information card media, or it may have totally different visible and magnetic content. Furthermore, the magnetic and electronic content may include data encoded in multiple machine readable formats and in multiple human languages.

In particular, the invention adopts and extends upon the conventional business or calling card. The information card media used may be chosen to intentionally resemble such conventional cards, but to employ and expand on the conventional role of these. Users can be expected to readily appreciate the information card as identifying and providing important information about its presenter and yet, particularly if the functional features of the back surface are made visually apparent, to also intuitively appreciate that the information card provides the same or additional information in one or more machine readable formats. Yet for all the additional benefits which the information card permits, it need not cost appreciably more than a conventional business or calling card. The information card media may be inexpensive and readily disposable, just as such conventional cards are, wherein the substrate of the card is the most expensive element in an overall quite inexpensive object.

Unlike conventional cards, the information card is machine readable. This permits its data to be readily employed, even automatically employed. The optional use of recorded data identifiers allows the data to be stored in databases or contact listings, and with appropriate software can cause telephone numbers, GPS data, etc. to be acted upon immediately to deal a telephone device (including pagers, facsimile machines, and other such devices) or to provide a map or route information.

The magnetic readers used by the invention also may be quite flexible, and employ widely available and economical technology. Both linear and rotary type reading machines may be used. Suitable liner readers for this are already in wide use by merchants, and with suitable incentive may readily be adopted by individuals as well. Small, inexpensive linear magnetic readers may also be incorporated into a wide range of common and emerging devices, and thus permitting use of the information card and obtaining the benefits of the present invention. For example, the user of a cell phone with an installed linear reader may simply swipe an information card through the reader and have one or more telephone numbers added to a speed dial database or even one dialed automatically. And similar examples of using information cards with PDAs and GPS devices have also been presented herein.

Rotary type magnetic reading mechanisms are widely used today, including considerable use by individuals. The invention may employ specialized rotary mechanisms, or extend upon and use conventional ones. Common computer systems today almost always have at least on removable media drive unit, typically a 3.5" floppy disk drive. The present invention may employ a mounting cartridge in which the information card is mounted and then loaded into such a floppy disk drive for reading and writing the data. Furthermore, such mounting cartridges can themselves be quite economical, as the low coast of floppy diskette cartridges evidences. The mounting cartridges can also be made of durable material, if desired.

Similarly, the invention may use electronic readers (RFID interrogators or RFID reads as they are known in the art) that are generally conventional and in use presently or easily incorporated for use with the invention.

For the above, and other, reasons, it is expected that the data distribution system 10 of the present invention will have widespread industrial applicability. Therefore, it is expected that the commercial utility of the present invention will be extensive and long lasting.

What is claimed is:

1. An information card for distributing data, comprising:
a front surface, a back surface, and four edges defining a rectangular shape such that the information card resembles a conventional business card;
the information card including upon its said front surface visually-recognizable indicia; and
the information card including upon its said back surface at least one stripe zone and a ring zone able to contain magnetically recorded instances of the data; and
said information card including a passive type radio-frequency identification (RFID) tag able to store instances of the data; and
wherein at least one of said zones is readable by placing said information card proximate to a stationary read mechanism and said RFID tag is readable by placing said information card proximate to a RFID interrogator.

2. The information card of claim 1, wherein at least one member of the set consisting of said zones and said RFID tag does contain the data.

3. The information card of claim 2, wherein the data includes at least one encoded version of at least some of said visually-recognizable indicia appearing upon said front surface of the information card.

4. The information card of claim 2, wherein at least one member of the set consisting of said zones and said RFID tag further includes data identifiers associated with at least some of the data.

5. The information card of claim 2, wherein at least one of said zones further includes at least one data orientator to permit reading the data regardless of a relative orientation of the information card relative to said stationary read mechanism.

6. The information card of claim 2, wherein at least one member of the set consisting of said zones and said RFID tag includes instances of the data including extensible markup language tagging.

7. The information card of claim 1, wherein the information card is substantially constructed with a paper or plastic based substrate material, to facilitate economical manufacture of the information card.

8. The information card of claim 1, wherein said RFID tag includes a manually operable switch to permit selective control of said RFID tag being readable.

9. An information card for distributing data, comprising:
a front surface, a back surface, and four edges defining a rectangular shape such that the information card resembles a conventional business card;
the information card including upon its said front surface visually-recognizable indicia; and
the information card including upon its said back surface at least one stripe zone and a ring zone able to contain magnetically recorded instances of the data; and
said information card including an active type radio-frequency identification (RFID) tag able to store instances of the data;
said information card including a member of the set consisting of piezo-electric power sources and photo-electric power sources to power said RFID tag; and
wherein at least one of said zones is readable by placing said information card proximate to a stationary read mechanism and said RFID tag is readable by placing said information card proximate to a RFID interrogator.

10. The information card of claim 9, wherein at least one member of the set consisting of said zones and said RFID tag does contain the data.

11. The information card of claim 10, wherein the data includes at least one encoded version of at least some of said visually-recognizable indicia appearing upon said front surface of the information card.

12. The information card of claim 10, wherein at least one member of the set consisting of said zones and said RFID tag further includes data identifiers associated with at least some of the data.

13. The information card of claim 10, wherein at least one of said zones further includes at least one data orientator to permit reading the data regardless of a relative orientation of the information card relative to said stationary read mechanism.

14. The information card of claim 10, wherein at least one member of the set consisting of said zones and said RFID tag includes instances of the data including extensible markup language tagging.

15. The information card of claim 9, wherein the information card is substantially constructed with a paper or plastic based substrate material, to facilitate economical manufacture of the information card.

16. The information card of claim 9, wherein said RFID tag includes a manually operable switch to permit selective control of said RFID tag being readable.

* * * * *